Figure 1:
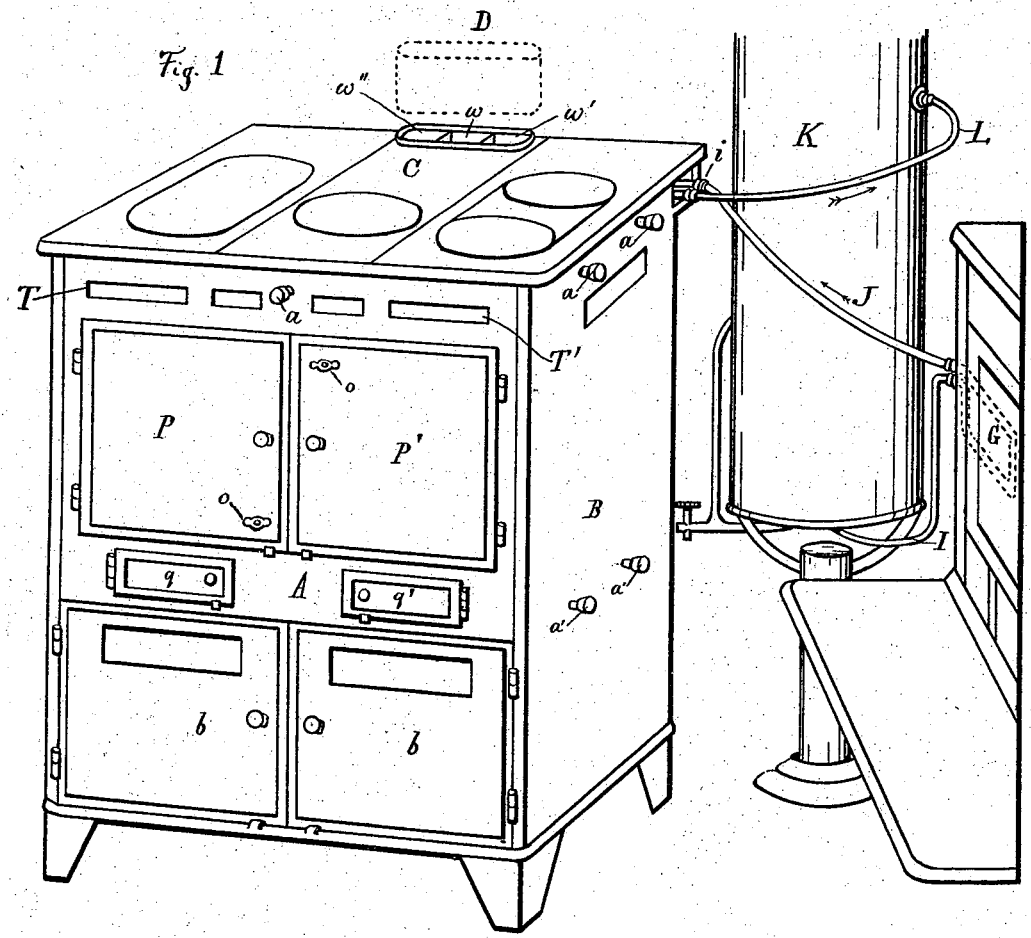

(No Model.) 2 Sheets—Sheet 1.

L. M. STONE.
GAS STOVE.

No. 518,903. Patented Apr. 24, 1894.

Witness
C. R. Osgood
C. G. Cramsell

Inventor
Laura M. Stone,
By Geo. B. Selden,
Attorney (No Model.) 2 Sheets—Sheet 2.
L. M. STONE.
GAS STOVE.
No. 518,903. Patented Apr. 24, 1894.
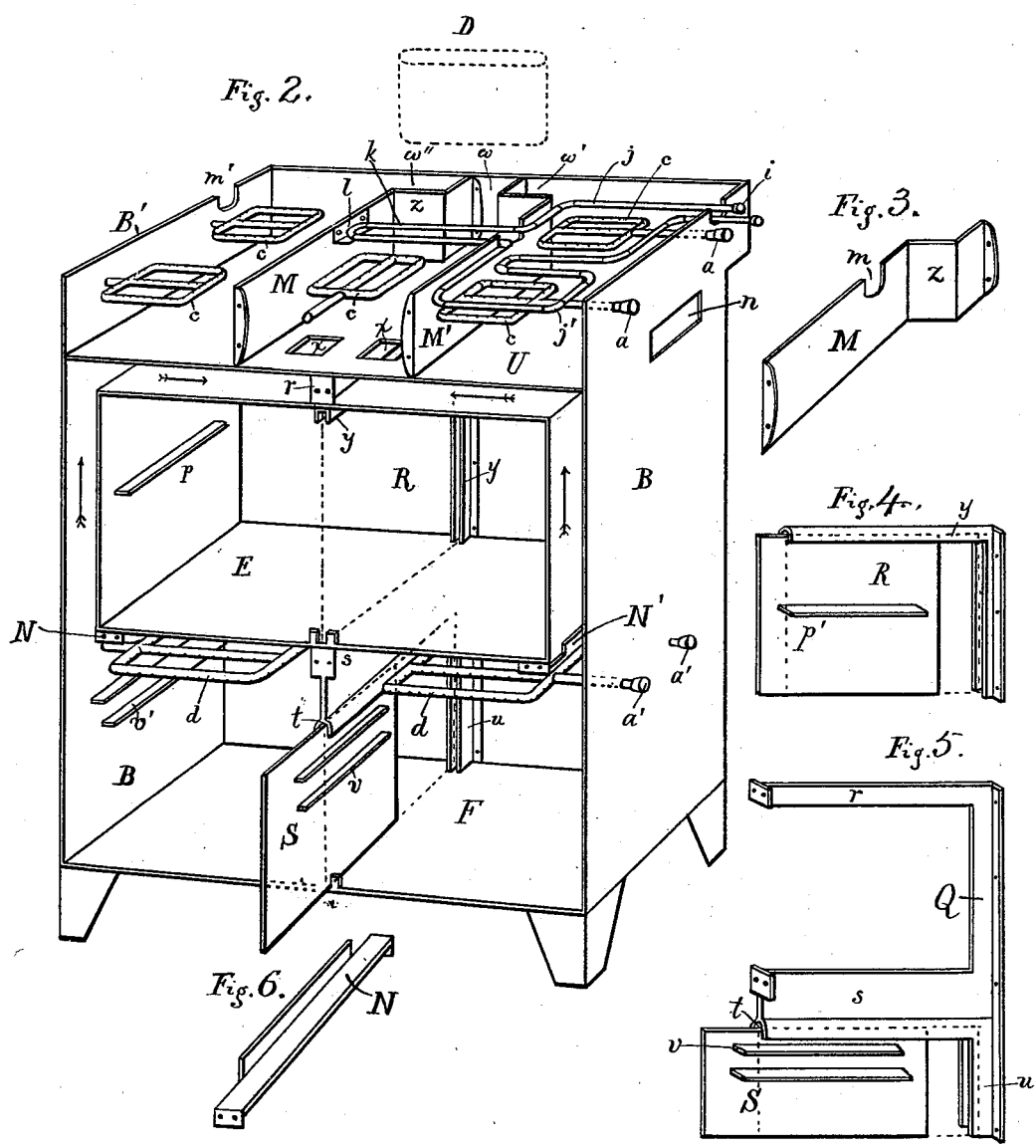
Witness
C. R. Osgood.
C. J. Cranwell.
Inventor
Laura M. Stone,
By Geo. B. Selden,
Attorney

UNITED STATES PATENT OFFICE.

LAURA MARIA STONE, OF ROCHESTER, NEW YORK.

GAS-STOVE.

SPECIFICATION forming part of Letters Patent No. 518,903, dated April 24, 1894.

Application filed August 13, 1892. Serial No. 442,959. (No model.)

*To all whom it may concern:*

Be it known that I, LAURA MARIA STONE, a citizen of the United States, residing at Rochester, in the county of Monroe, in the State of New York, have invented certain Improvements in Gas-Stoves, of which the following is a specification, reference being had to the accompanying drawings.

My invention relates to certain improvements in the construction and arrangement of gas-stoves,—which improvements are fully described and illustrated in the following specification, and the accompanying drawings,—the novel features thereof being specified in the claims annexed to the said specification.

My improvements in gas-stoves are represented in the accompanying drawings, in which—

Figure 1 is a perspective view of my improved gas-stove, showing the manner of connecting it to a water-tank and an ordinary coal range. Fig. 2 is a perspective view of my improved gas-stove, the top and front being removed. Fig. 3 represents one of the partitions in the upper part of the stove, detached. Fig. 4 represents the partition which divides the baking oven, detached. Fig. 5 represents the partition in the roasting oven, and the frame for supporting the same. Fig. 6 represents the support for the baking oven, detached.

My improved gas-stove consists essentially of a suitable casing, having a front A, sides B B′, top C, and corresponding back and bottom, said casing inclosing an upper section or compartment formed by the partition U, a baking oven E, and roasting oven F. The burners $c$ are used in the upper compartment, for boiling or cooking, and the baking and roasting ovens are both heated by the burner or burners $d$.

D is a pipe or chimney to receive escaping products of combustion from the several exits $w\ w'\ w''$.

The stove has partitions stationary, and movable, which divide its interior in a novel manner and enable the heat to be concentrated where it is wanted for special uses. There are two stationary partitions M M′ in the top which make three compartments. The two side compartments are alike, each having two boiling places, two gas burners $c$, separate air inlets, T T′, and escape flues $w\ w'\ w''$. The middle compartment has one large boiling place, one gas burner, an air draft and an escape flue $w$. The baking oven has a partition R which slides in ways in the top and back of the oven, and divides it in the middle.

P P′ are doors in the baking oven, and $b\ b$ doors for the roasting oven. The baking oven has a hot air space around the sides and back and over the top. The roasting oven is immediately under the baking oven and in the bottom of the stove. The roasting oven has a removable partition S in the center dividing it into two compartments each having a large gas burner $d$, adapted either to roast or bake, the burner orifices being directed downwardly. This partition is arranged so that it may be slid in and out of the oven, being supported by the frame Q, (see Fig. 5,) which consists of an upright portion $u$ and a bar $r$ which extends forward over the top of the baking oven, and another bar, $s$ which supports the baking oven and is provided with a slot or way $t$ in which the partition S slides, thus dividing the roasting oven in the middle when desired. The upper bar $r$ divides the flue space between the top of the oven E and the partition U in the middle, thus compelling the products of combustion from either of the burners $d$ in the roasting oven to pass through the openings $x$ in the said partition and thence through the central compartment of the upper part of the stove, to the exit $w$. The frame is attached to the stove in any suitable manner. When the removable partition R is in the baking oven E, and the removable partition S in the roasting oven, with one gas burner lighted, one half of the baking oven and one half of the roasting oven can be used and the heat of the single burner confined thereto. The products of combustion from a burner in a roasting oven, pass up around one side and one half of the back and over one half of the top of the baking oven and then out through an opening $x$ in the floor U of the middle compartment to the exit $w$ of that compartment and to the chimney. This opening $x$ is at one side of the bar $r$ which divides the flue space over the baking oven. There is another opening $x$ in the floor of the middle compartment situated on the other side of the partition or bar $r$ through which the hot products from the other side of the ovens, and from another burner $d$ may pass out on the way to the chimney. Half of the ovens therefore can be used or by taking out the removable portion R in the baking oven and lighting both burners in the roasting oven, the whole baking oven can be used. The removable partition S in the roasting oven will usually be left in place and roasting can be done on one side and broiling or toasting on the other side at the same time. The partition S is taken out for a very large roast.

The partition or floor U in the upper part of the stove which covers the hot air space over the baking oven is the whole size of the stove, and fastened to its front, back and sides in any convenient manner. The partitions M M' fit tightly to the floor U and divide the upper part of the stove into compartments each having a burner or burners and covered pot holes and constituting a little stove by itself. The partitions M M' are each offset as shown at $z$, Fig. 6, so that the burned gases from the side compartments pass through the exits $w'$ $w''$. The openings $x$ in the floor of the middle compartment provide escape for the products from the burners in the roasting oven and the narrow middle compartment bounded on each side by said portions constitutes an exit flue leading to the chimney. The middle compartment therefore will receive heat from the roasting oven burners, which can be utilized. When two boiling places only are needed one upper side compartment can be used. When but one boiling place is needed the middle compartment is preferably used.

$q$ $q'$, Fig. 1, are doors which open to the gas burners $d$ in the roasting oven, so they can be easily lighted and inspected. The openings in roasting oven doors, $b$ $b$ are for air drafts, and to permit examination of the roast without opening the doors. The decorations $o$ on the corners of the baking oven doors are covers for ventilating holes and turn to leave the holes open or closed as desired.

An extension at the back of the stove top provides a larger surface to said top, and allows an elevated warming closet to be put on if desired.

The stove may be made with or without the extension top the exits $w$ and $w'$ being suitably situated in each case.

The ovens are provided with ledges $p$ $p'$ and $v$ $v'$ respectively upon which perforated shelves are placed.

$n$ indicates one of two or more openings for the introduction of a dust brush.

$a$ and $a'$ denote gas pipe couplings for the burners $c$ and $d$ respectively.

It will be readily understood from the foregoing that either half or the whole of the four oven compartments may be used and either one or more of the boiling burner compartments and in every case the hot products from the roasting and baking burners are directed under one or more side boiling burner compartments and through the middle one directly under the central cooking hole.

I contemplate the use of a water heating coil $j$, $k$ supported on a bracket $l$ and in notches $m$ $m'$ and coupled at $i$ $i'$ to pipes L and J, communicating with a tank K and the water back G of a range. Such coil however is not essential to the present invention, nor are all the three compartments of the upper section nor the particular partitions for the ovens or such other like mechanical details as do not necessarily involve the matters herein claimed.

No claim is made to combinations including the gas stove stand boiler, range and water heating devices illustrated herein as such matter constitutes the subject of my application filed May 31, 1893, and serially numbered 476,190.

Having thus fully described my invention, what I claim is—

1. The combination, in a gas stove, of an upper section comprising three compartments, each adapted to receive an independent burner and having an independent exit flue in close proximity with the others and formed by partitions in the said upper section and a single escape pipe communicating with the exit at the top of the stove, substantially as described.

2. In a gas stove, roasting ovens each provided with a separate burner capable of independent use, baking ovens situated above said first named ovens, each baking oven being adapted to be heated by the burner of a roasting oven, a separate flue for each burner passing about a baking oven and having an individual exit leading to a common flue, substantially as set forth.

3. In a gas stove, roasting ovens each provided with a separate burner capable of independent use, baking ovens situated above the first named ovens, each baking oven being adapted to be heated by the burner of a roasting oven, a separate flue for each burner passing about a baking oven and having an individual exit leading to a common flue, said flue being provided with a cooking opening in its top and with a gas burner, substantially as set forth.

4. In a gas stove roasting ovens each provided with a separate burner capable of independent use, baking ovens situated above the first named ovens, each baking oven being adapted to be heated by the burner of a roasting oven, a separate flue for each burner passing about a baking oven and having an individual exit leading to a common flue, said flue being provided with a cooking opening in its top and with a gas burner, and situated between combustion chambers and adapted to be laterally heated thereby, substantially as set forth.

5. In a gas stove, roasting ovens each provided with a separate burner capable of independent use, baking ovens situated above said first named ovens, each baking oven being adapted to be heated by the burner of a roasting oven, a separate flue for each burner passing about a baking oven and having an individual exit leading to a common flue, said flue being provided with a cooking opening in its top and with a gas burner, and situated between combustion chambers and adapted to be laterally heated thereby, all the said chambers having adjacent exits into a single escape pipe or chimney, substantially as set forth.

6. The combination, in a gas-stove, of an upper section having a central flue or compartment provided with an exit, the baking oven, the roasting oven below the baking oven, and provided with a partition and the burners $d$, the separate flues surrounding the baking oven, and the openings $x\ x$ communicating between the flues and the central compartment, substantially as described.

LAURA MARIA STONE.

Witnesses:
C. G. CRANNELL,
GEO. B. SELDEN.